(12) United States Patent
Hayes, Jr.

(10) Patent No.: US 7,716,663 B2
(45) Date of Patent: May 11, 2010

(54) METHOD, SYSTEM AND PROGRAM PRODUCT FOR CONTROLLING NATIVE APPLICATIONS USING OPEN SERVICE GATEWAY INITIATIVE (OSGI) BUNDLES

(75) Inventor: Kent F. Hayes, Jr., Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 1146 days.

(21) Appl. No.: 10/787,521

(22) Filed: Feb. 26, 2004

(65) Prior Publication Data

US 2005/0193388 A1 Sep. 1, 2005

(51) Int. Cl.
*G06F 9/445* (2006.01)
(52) U.S. Cl. ............ 717/174; 717/175; 717/176; 717/177; 717/178
(58) Field of Classification Search ......... 717/174–178; 709/203, 220
See application file for complete search history.

(56) References Cited

U.S. PATENT DOCUMENTS

| | | | |
|---|---|---|---|
| 4,751,635 A | 6/1988 | Kret | |
| 6,106,569 A * | 8/2000 | Bohrer et al. | 717/108 |
| 6,237,143 B1 | 5/2001 | Fontana et al. | |
| 6,553,563 B2 | 4/2003 | Ambrose et al. | |
| 7,191,232 B2 * | 3/2007 | Rigori et al. | 709/226 |
| 7,207,041 B2 * | 4/2007 | Elson et al. | 718/104 |
| 2003/0014521 A1 | 1/2003 | Elson et al. | |
| 2003/0038172 A1 | 2/2003 | Bodin et al. | |
| 2003/0046681 A1 * | 3/2003 | Barturen et al. | 717/177 |
| 2003/0105854 A1 * | 6/2003 | Thorsteinsson et al. | 709/203 |
| 2003/0191823 A1 * | 10/2003 | Bansal et al. | 709/220 |
| 2004/0117494 A1 * | 6/2004 | Mitchell et al. | 709/230 |
| 2004/0267950 A1 * | 12/2004 | Praefcke et al. | 709/231 |

OTHER PUBLICATIONS

Liang, et al. "Bundle Dependency in Open Services Gateway Initiative Framework Initialization", 2002, IEEE, p. 122-126.*
Marples, et al. "The Open Services Gateway Initiative: An Introductory Overview", 2001, IEEE, p. 110-114.*
Kawamura, et al. "Standardization Activity of OSGi (Open Services Gateway Initiative)", Jan. 2004, NTT Technical Review, p. 94-97.*
Hall, et al. Component Deployment on OSGi: The Gravity Case, Jan. 29, 2003, Fractal Workshop, Slides 1-53.*
Grotjohn et al., "An Integrated Method for Installing Non-Integrated Software", IBM Research Disclosure, vol. 41, No. 408, Apr. 1998, pp. 1-4.

(Continued)

*Primary Examiner*—Ted T Vo
*Assistant Examiner*—Qamrun Nahar
(74) *Attorney, Agent, or Firm*—Lee Law, PLLC; Christopher B. Lee

(57) ABSTRACT

Under the present invention, a native application is packaged within an Open Service Gateway Initiative (OSGi) bundle to create a link there between. Then, the OSGi bundle is installed within an OSGi environment of a client device. Once installed, the OSGi bundle is deployed in a native environment of the client device and the native application is removed from within the OSGi bundle while maintaining the link. Thereafter, the native application within the native environment can be controlled from the server using the OSGi bundle within the OSGi environment.

36 Claims, 3 Drawing Sheets

OTHER PUBLICATIONS

INSPEC, AN-6514753, "Open Service Gateway Architecture Overview", Condry et al., Conference Proceedings, IEEE, 1999, Abstract only.

INSPEC, AN-7117134, "The Open Services Gateway Initiative: An Introductory Overview", Marples et al., IEEE Communications Magazine, vol. 39, No. 12, pp. 110-114, Dec. 2001, Abstract only.

INSPEC, AN-7251008, "Service Gateway Architecture for a Smart Home", Valtchev et al., IEEE Communications Magazine, vol. 40, No. 4, pp. 126-132, Apr. 2002, Abstract only.

INSPEC, AN-7341720, "Context-aware Application Framework Based on Open Service Gateway", Kim et al., 2001 International Conferences on Info-Tech and Info-Net Proceedings, vol. 3, pp. 209-213, IEEE, Abstract only.

INSPEC, AN-7348407, "Context-aware Application Framework Based on Open Service Gateway", Kim et al., 2001 International Conferences on Info-Tech and Info-Net Proceedings, vol. 5, pp. 200-204, IEEE, Abstract only.

INSPEC, AN-7541847, "Experiences from Development of Home Health Care Applications Based on Emerging Java Technology", Lind et al., MEDINFO 2001, Proceedings of the 10$^{th}$ World Congress on Medical Informatics, London, UK, Sep. 2-5, 2001. Abstract only.

INSPEC, AN-7661625, "A Novel Architecture for Remote Home Automation E-Services on an OSGi Platform Via High-Speed Internet Connection Ensuring QoS Support by Using RSVP Technology", Topalis et al., IEEE Transactions on Consumer Electronics, vol. 48, No. 4, pp. 825-833, Nov. 2002, Abstract only.

* cited by examiner

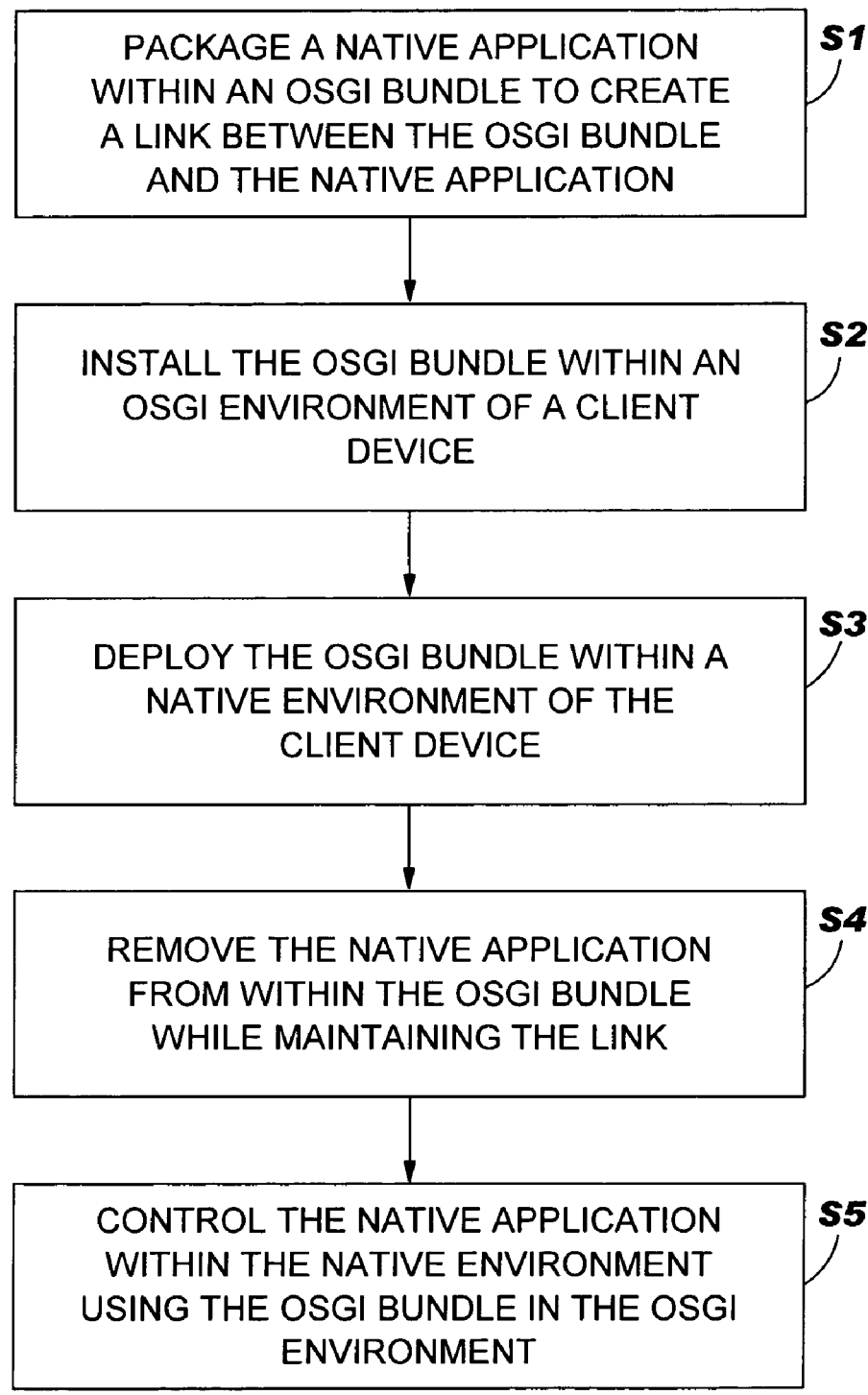

METHOD, SYSTEM AND PROGRAM PRODUCT FOR CONTROLLING NATIVE APPLICATIONS USING OPEN SERVICE GATEWAY INITIATIVE (OSGI) BUNDLES

BACKGROUND OF THE INVENTION

1. Field of the Invention

In general, the present invention generally relates to a method, system and program product for controlling native applications using open service gateway initiative (OSGi) bundles. Specifically, the present invention allows native applications running in a native environment on a client device to be controlled through OSGi bundles running in an OSGi environment on the client device.

2. Related Art

As computer networking has become more advanced, a standard known as the Open Service Gateway Initiative (OSGi) has been developed (OSGi is a trademark, registered trademark, or service mark of The OSGi Alliance in the US and other countries). The OSGi is an industry plan to provide a standard way to deliver managed services to devices and local networks. With such a standard, home users could, for example, change the setting on their thermostat from a remote location (e.g., the workplace). In general, the OSGi provides a good framework for developing application components. Under the OSGi, a basic component is known as an OSGi bundle. An OSGi application can be made up of combinations/suites of bundles that might use common functionality. To this extent, the OSGi allows developers to define the dependencies between the bundles such as the packages and services required by the bundles. The OSGi runtime can also determine whether a device has the necessary packages and resources. In a typical implementation, an OSGi architecture will include, among other components, a server and one or more client devices. Each client device will have an OSGi environment within which OSGi applications are deployed. Using a management program on the server, the functions of the OSGi applications can be controlled. One type of function often performed on OSGi client devices is life cycle management. Life cycle management allows OSGi applications to be staffed, stopped, updated, installed or uninstalled from the server.

Unfortunately, as convenient as the OSGi framework can be, it fails to provide for similar management/control of native applications on the client device. For example, a standard desktop (e.g., WIN-32 {WIN32 is a trademark, registered trademark, or service mark of Microsoft Corporation in the US and other countries}) computer could have several native application that run within a native environment. Typical examples of native applications include word processing programs, spreadsheets, etc. Since such applications are widely used, it would be highly advantageous to be able to control them in a similar manner from the OSGi environment. Currently, the only way to control the functions of the native application from the server is to write separate programs for each desired function. Not only is this extremely tedious, but it is also highly inefficient.

In general, the present invention provides a method, system and program product for controlling (e.g., managing a life cycle of) native applications using OSGi bundles. Specifically, under then the present invention, a native application is packaged within an OSGi bundle to create a link therebetween. Information describing the commands needed to control the life cycle of the bundle (install, uninstall, staff, stop) may also be stored within the OSGi bundle during this packaging step. In any event, the packaged OSGi bundle is installed within an OSGi environment of a client device. Once installed, the packaged OSGi bundle is deployed in a native environment of the client device and the native application is optionally removed from within the packaged OSGi bundle while maintaining the link. Thereafter, the native application within the native environment can be controlled from the server using the OSGi bundle within the OSGi environment.

A first aspect of the present invention provides a method for controlling native applications using Open Service Gateway Initiative (OSGi) bundles, comprising: packaging a native application within an OSGi bundle to create a link between the OSGi bundle and the native application (information describing the commands needed to control the life cycle of the bundle (install, uninstall, start, stop) may be stored within the bundle during the packaging step); installing the OSGi bundle within an OSGi environment of a client device after the packaging; deploying the OSGi bundle within a native environment of the client device; and controlling the native application within the native environment using the OSGi bundle within the OSGi environment.

A second aspect of the present invention provides a method for enabling life cycle management of native applications using Open Service Gateway Initiative (OSGi) bundles, comprising: packaging a native application within an OSGi bundle on a server to create a link between the OSGi bundle and the native application (information describing the commands needed to control the life cycle of the bundle (install, uninstall, start, stop) may be stored within the bundle during the packaging step); installing the OSGi bundle within an OSGi environment of a client device after the packaging; deploying the OSGi bundle within a native environment of the client device; removing the native application from within the OSGi bundle while maintaining the link; and managing a life cycle of the native application within the native environment using the OSGi bundle in the OSGi environment.

A third aspect of the present invention provides a system for controlling native applications using Open Service Gateway Initiative (OSGi) bundles, comprising: a packaging system for packaging a native application within an OSGi bundle to create a link between the OSGi bundle and the native application (information describing the commands needed to control the life cycle of the bundle (install, uninstall, start, stop) may be stored within the bundle during the packaging step); an exportation system for installing the OSGi bundle within an OSGi environment of a client device, wherein the OSGi bundle is thereafter deployed within a native environment of the client device; and a control system for controlling the native application within the native environment using the OSGi bundle within the OSGi environment.

A fourth aspect of the present invention provides a system for controlling native applications using Open Service Gateway Initiative (OSGi) bundles, comprising: means for packaging a native application within an OSGi bundle to create a link between the OSGi bundle and the native application; means for installing the OSGi bundle within an OSGi environment of a client device; means for deploying the OSGi bundle within a native environment of the client device; means for removing the native application from within the OSGi bundle while maintaining the link; and means for managing a life cycle of the native application within the native environment using the OSGi bundle within the OSGi environment.

A fifth aspect of the present invention provides a program product stored on a recordable medium for controlling native applications using Open Service Gateway Initiative (OSGi) bundles, which when executed, comprises: program code for packaging a native application within an OSGi bundle to create a link between the OSGi bundle and the native application (information describing the commands needed to control the life cycle of the bundle (install, uninstall, start, stop) may be stored within the bundle during the packaging step); program code for installing the OSGi bundle within an OSGi environment of a client device, wherein the OSGi bundle is thereafter deployed within a native environment of the client device; and program code for controlling the native application within the native environment using the OSGi bundle within the OSGi environment.

Therefore, the present invention provides a method, system and program product for controlling native application using OSGi bundles.

BRIEF DESCRIPTION OF THE DRAWINGS

These and other features of this invention will be more readily understood from the following detailed description of the various aspects of the invention taken in conjunction with the accompanying drawings in which:

FIG. 3 depicts a method flow diagram according to the present invention.

Figure 1:
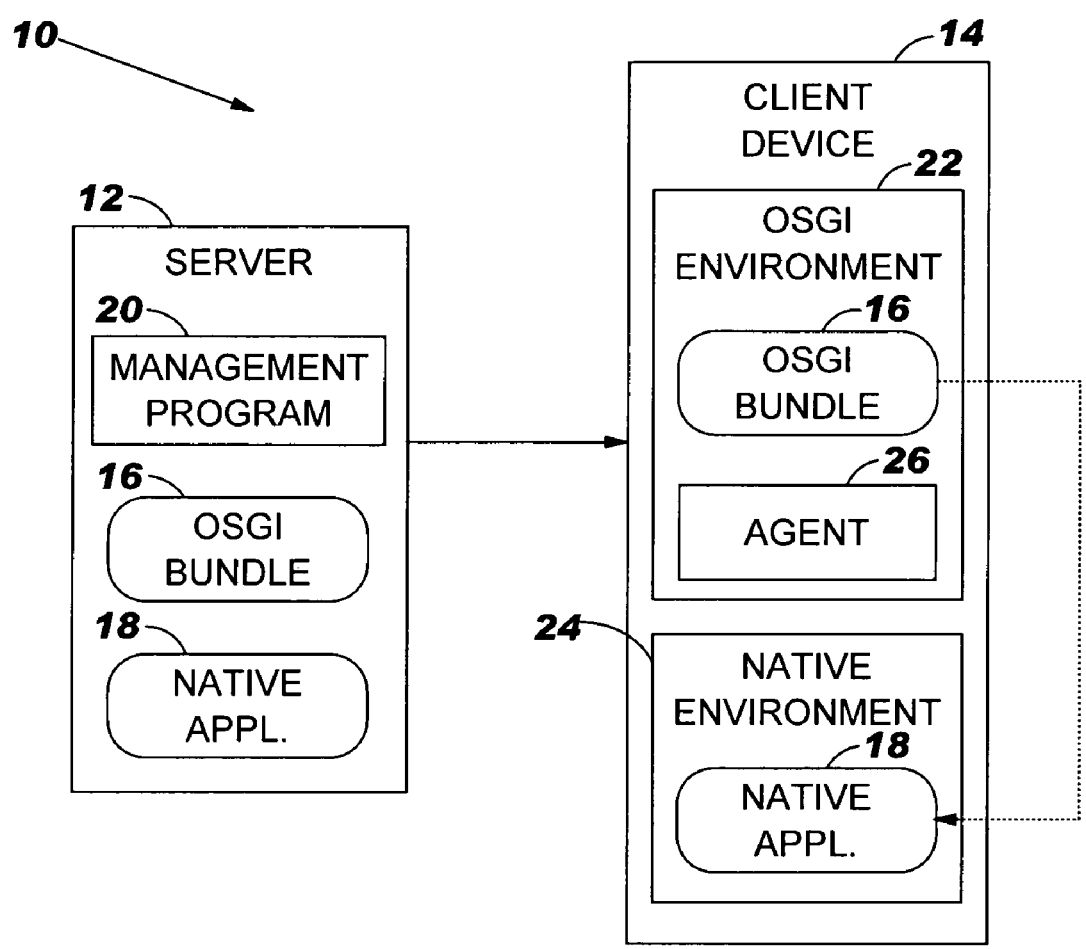
FIG. 1 depicts an illustrative system for controlling native applications using OSGi bundles according to the present invention.

It is noted that the drawings of the invention are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE DRAWINGS

For convenience purposes, the Detailed Description of the Drawings will have the following sections:
I. General Description
II. Detailed Example I. General Description As indicated above, the present invention provides a method, system and program product for controlling (e.g., managing a life cycle of) native applications using OSGi bundles. Specifically, under the present invention, a native application is packaged within an OSGi bundle to create a link therebetween. In packaging the native application within the OSGi bundle, information describing the commands needed to control the life cycle of the bundle (install, uninstall, start, stop) may be stored within the OSGi bundle as well. In any event, the OSGi bundle is installed within an OSGi environment of a client device. Once installed, the OSGi bundle is deployed in a native environment of the client device and the native application is removed from within the OSGi bundle while maintaining the link. Thereafter, the native application can be controlled from the server through the OSGi bundle.

Referring now to FIG. 1, an illustrative system 10 for controlling native applications using OSGi bundles according to the present invention is shown. As depicted, system 10 includes server 12 and client device 14 (a single client device is shown for illustrative purposes only). It should be understood that the architecture shown herein is illustrative only and will likely include other known components not shown. For example, a typical embodiment of the invention would likely include a device, OSGi agents (on client device 14), a device management server and one or more application servers. Moreover, it should be understood that a typical embodiment of the invention could include multiple servers 12 and a network dispatcher. In any event, client device 14 is intended to represent any type of computerized device capable of communicating over a network. For example, client device 14 could be a desktop computer (e.g., WIN-32-based), a hand held device, a set top box, a home appliance, a security system, etc. In any event, server 12 and client device 14 typically communicate over any type of network such as the Internet, a local area network (LAN), a wide area network (WAN), a virtual private network (VPN), etc. As such, communication between server 12 and client device 14 could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, client device 14 could utilize an Internet service provider to establish connectivity to server 12.

Under the present invention, server 12 will be provided with one or more OSGi bundles 16 and a native application 18. As known, an OSGi bundle is essentially a JAR file with certain characteristics which enable it to effectively interact with the OSGi framework. As such, OSGi bundle 16 has the ability to be controlled in a well defined manner. To enable control of native application 18 on client device 14, management program 20 will create a link between native application 18 and OSGi bundle 16. In a typical embodiment, this is accomplished by packaging the native application 18 within OSGi bundle 16. Once packaged, management program 20 will install the OSGi bundle 16 (which now includes native application 18) within OSGi environment 22 of client device 14. Once installed, the OSGi bundle 16 will be deployed in native environment 24 (e.g., a WIN-32 environment) and then native application 18 will be removed OSGi bundle 16 while maintaining the link therewith. At this point, only native application 18 will remain in native environment 24, while OSGi bundle 16 will remain in OSGi environment 22. This allows OSGi bundle 16 to be thought of as a "control bundle." Specifically, when control over native application 18 from server 12 is desired, management program 20 can be used to issue "commands." These commands will be received by agent 26 and communicated to the OSGi bundle 16 in OSGi environment 22. Thereafter, OSGi bundle 16 will instruct agent 26 (e.g., a WIN-32 agent) to carry out the command on native application 18 in native environment 24.

II. Detailed Example

Figure 2:
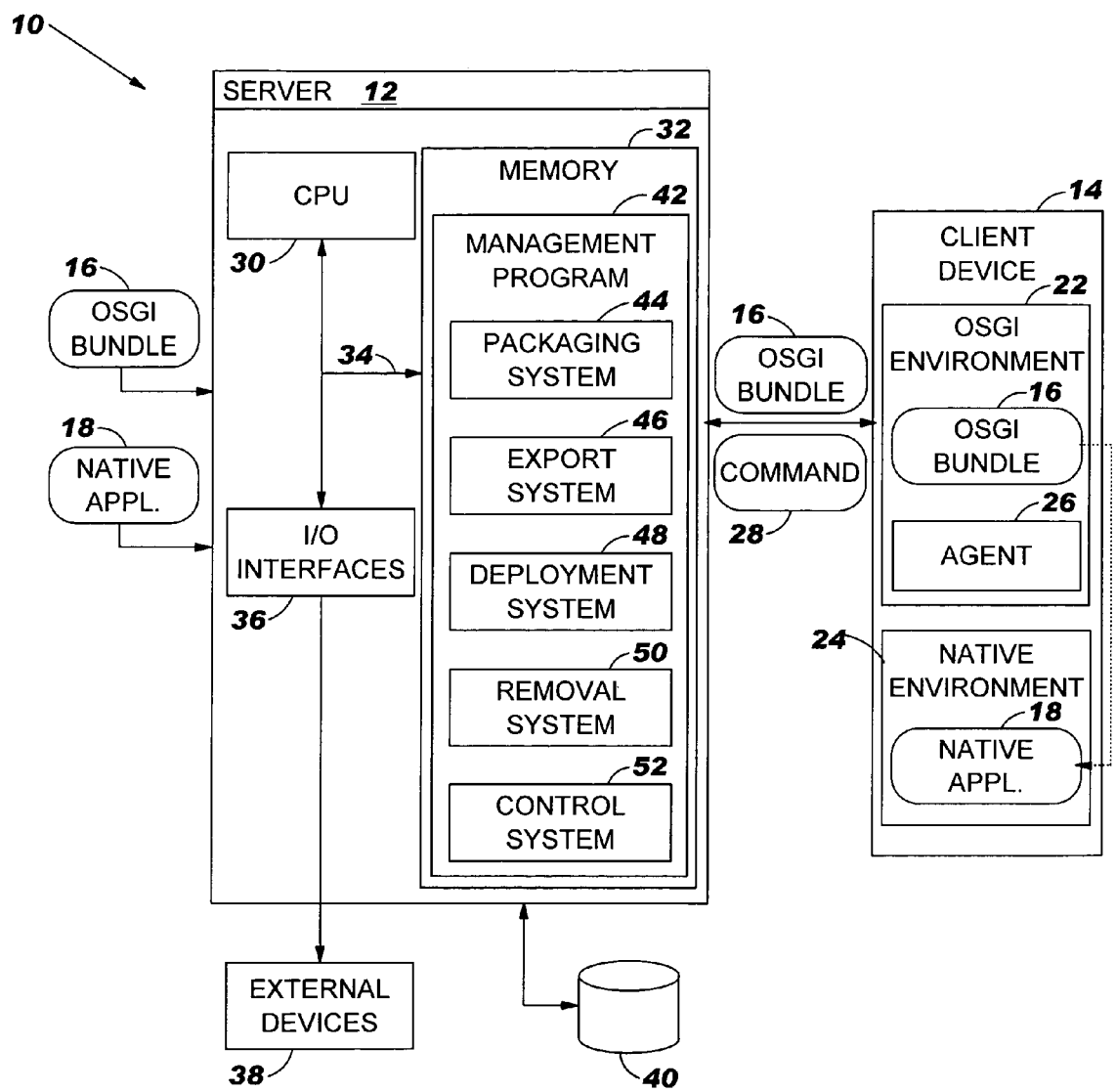
FIG. 2 depicts the system of FIG. 1 in greater detail.

Referring now to FIG. 2, a more detailed diagram of FIG. 1 is shown. As shown, server 12 generally comprises central processing unit (CPU) 30, memory 32, bus 34, input/output (I/O) interfaces 36, external devices/resources 38 and storage unit 40. CPU 30 may comprise a single processing unit, or be distributed across one or more processing units in one or more locations, e.g., on a client and computer system. Memory 32 may comprise any known type of data storage and/or transmission media, including magnetic media, optical media, random access memory (RAM), read-only memory (ROM), a data cache, etc. Moreover, similar to CPU 30, memory 32 may reside at a single physical location, comprising one or more types of data storage, or be distributed across a plurality of physical systems in various forms.

I/O interfaces 36 may comprise any system for exchanging information to/from an external source. External devices/resources 38 may comprise any known type of external device, including speakers, a CRT, LCD screen, handheld device, keyboard, mouse, voice recognition system, speech output system, printer, monitor/display, facsimile, pager, etc. Bus 34 provides a communication link between each of the components in server 12 and likewise may comprise any known type of transmission link, including electrical, optical, wireless, etc.

Storage unit 40 can be any system (e.g., database) capable of providing storage for information under the present invention. Such information could include, for example, information about which native applications are packaged within which OSGi bundles etc. As such, storage unit 40 could include one or more storage devices, such as a magnetic disk drive or an optical disk drive. In another embodiment, storage unit 40 includes data distributed across, for example, a local area network (LAN), wide area network (WAN) or a storage area network (SAN) (not shown). Although not shown, additional components, such as cache memory, communication systems, system software, etc., may be incorporated into server In addition, it should also be appreciated that although not shown, client device 14 would likely include computerized components similar to server 12.

Shown in memory 32 of server 12 is management program 42. Under the present invention, management program 42 can include parts or all of any OSGi management program now known or later developed. However, under the present invention, management program 42 is adapted (i.e., includes certain sub-systems) to provide for the control of native applications using OSGi bundles (a function not previously realized). Specifically, as shown, management program 42 includes packaging system 44, export system 46, deployment system 48, removal system 50 and control system 52. It should be understood that each of these systems includes program code/logic for carrying out the functions described herein. To this extent, the systems could be realized as plugins or the like. Moreover, as will be further described below certain systems such as deployment system 48 and removal system 50 could be optional.

Regardless, under the present invention, packaging system 44 will package native application 18 within OSGi bundle 16 to create a link there between. The linkage of OSGi bundle 16 to life cycle functions (like uninstall) of native application 18 could be done generically if the environment permits (e.g., WIN-32), or more specifically for native application 18 via running scripts, executable file, etc. In a typical embodiment, native application 18 and OSGi bundle 16 are assigned the same name once the packaging has occurred. Thus, for example, the packaged OSGi bundle 16 could be assigned the name of native application 18. In any event, a record of the linkage (e.g., packaging) will be maintained by server 14 in storage unit 40. This allows the correct OSGi bundle to later be identified when control over the native application 18 on client device 14 is desired.

Once native application 18 is packaged within OSGi bundle 16, it will be registered with server (e.g., in storage unit 40 and/or cache). The OSGi bundle 16 containing the native application 18 is then available for distribution to appropriate client devices such as client device 14. In a typical embodiment, a management action is initiated to deploy OSGi bundle 16 (and hence native application 18) to OSGi environment 22 of client device 14. Thereafter, the act of starting OSGi bundle 16 causes native application 18 to be extracted from OSGi bundle 16, and the "Install" program for native application 18 to be executed. Native application 18 is then removed from OSGi bundle 16 leaving only a "controller bundle" with it's associated links to the native application 18.

In an optional alternative embodiment, separate optional program code components could perform these functions. For example, export system 46 could install OSGi bundle 16 (having native application 18 therein) within OSGi environment 22 of client device 14. Thereafter, deployment system 48 could deploy OSGi bundle 16 within native environment 24. Once deployed, removal system 50 would remove native application 18 from within OSGi bundle 16, and then remove OSGi bundle 16 from native environment 24. At this point, native application 18 is deployed in native environment 24, while OSGi bundle is deployed within OSGi environment 22. It should be understood that each system within management program 42 need not be loaded on server 12. For example, deployment system 48 and/or removal system 50 could alternatively be loaded on client device 14 or packaged within OSGi bundle 16 with native application 18.

Regardless, if control of native application 18 is later desired, such control can be enabled using OSGi bundle 16. For example, assume an operator or the like (not shown) wishes to manage a life cycle of native application 18 (e.g., start, stop, install or uninstall). The operator would use control system 52 to issue a life cycle command 28 requesting a certain action to OSGi bundle 16. Since a record has been maintained on server 12 corresponding to the link between native application 18 and OSGi bundle 16, command system 52 can identify the correct OSGi bundle 16. The command 28 would be received by the agent and relayed to the OSGi bundle 16, which would instruct OSGi bundle 16 to carry out the instruction therein. In a typical embodiment, agent 26 is a WIN-32 agent that interfaces with native environment to perform the requested action such as starting, stopping, installing or uninstalling native application 18.

It should be understood that other embodiments of controlling native application 18 are also possible. For example, the command could be received by agent 26, relayed to OSGi bundle 16, which would then request agent 26 to carry out the command 28. Alternatively, the command 28 could be received by agent 26, relayed to OSGi bundle 16, which would carry out the command 28 itself. Still yet, the command 28 could be received by OSGi bundle 16 bundle, which would carry out the command 28 (e.g., via agent code or calls to agent code packed within OSGi bundle 16).

It should be appreciated that client device 14 could maintain its own record of links between OSGi bundles and native applications. Although not necessary, this could provide some redundancy in the system. It should also be understood that the present invention can be realized in hardware, software, or a combination of hardware and software. Any kind of computer system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

Referring now to FIG. 3, a method flow diagram 100 according to the present invention is shown. As depicted, first step S1 is to package a native application within an OSGi bundle to create a link between the native application and the OSGi bundle. Second step S2 is to install the OSGi bundle within an OSGi environment of a client device. Third step is to deploy the OSGi bundle within a native environment of the client device. Fourth step S4 is to remove the native application from within the OSGi bundle while maintaining the link. Fifth step S5 is to control the native application within the native environment using the OSGi bundle in the OSGi environment.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

I claim:

1. A computer-implemented method for controlling native applications using control bundles, comprising:
   packaging, at an application management server, a native application within a control bundle to create a link between the control bundle and the native application;
   installing, via the application management server, the control bundle within a control environment of a client device after the packaging;
   issuing a command from the application management server to the installed control bundle to cause the control bundle to extract the native application from the control bundle at the client device, where the created link between the control bundle and the native application is maintained;
   deploying, via the installed control bundle in response to the command issued by the application management server, the extracted native application directly within a native environment of the client device, the native environment being an environment of a primary operating system of the client device and separate from the control environment; and
   controlling the native application from the application management server within the native environment via the control bundle installed within the control environment using the maintained link.

2. The method of claim 1, wherein the controlling step comprises managing a life cycle of the native application.

3. The method of claim 2, wherein the managing step comprises performing an action selected from a group consisting of starting the native application, stopping the native application, installing the native application and uninstalling the native application.

4. The method of claim 2, wherein the managing step comprises:
   issuing a life cycle command from the application management server, where the life cycle command is executed
   on the native application through an agent on the client device.

5. The method of claim 4, wherein the agent comprises a standard desktop agent within the control environment and wherein the native application is a standard desktop application.

6. The method of claim 1, wherein the native application is packaged within the control bundle on the application management server, and wherein the installing step comprises exporting the control bundle from the application management server to the client device.

7. The method of claim 1, where the command is sued from the application management server to the installed control bundle to cause the control bundle to extract the native application from the control bundle at the client device further causes the native application to be removed from within the control bundle while maintaining the link.

8. A computer-implemented method for enabling life cycle management of native applications using control bundles, comprising:
   packaging a native application within a control bundle on an application management server to create a link between the control bundle and the native application;
   installing, via the application management server, the control bundle within a control environment of a client device after the packaging;
   issuing a command from the application management server to the installed control bundle to cause the control bundle to extract the native application from the control bundle at the client device, where the created link between the control bundle and the native application is maintained;
   deploying, via the installed control bundle in response to the command issued by the application management server, the extracted native application directly within a native environment of the client device, the native environment being an environment of a primary operating system of the client device and separate from the control environment; and
   controlling a life cycle of the extracted native application from the application management server within the native environment via the control bundle installed within the control environment using the maintained link.

9. The method of claim 8, wherein the managing step comprises:
   issuing a life cycle command from the application management server, where the life cycle command is executed
   on the native application through an agent on the client device.

10. The method of claim 9, wherein the life cycle command causes the agent to manage the life cycle of the native application.

11. The method of claim 10, wherein the agent comprises a standard desktop agent within the control environment.

12. The method of claim 8, wherein the managing step comprises performing an action selected from a group consisting of starting the native application, stopping the native application, installing the native application and uninstalling the native application.

13. A system for controlling native applications using control bundles, comprising:
   a processor; and
   a memory, the memory comprising:
   a packaging system for packaging at an application management server, a native application within a control bundle to create a link between the control bundle and the native application;
   an exportation system configured to install via the application management server, the control bundle within a control environment of a client device in response to the packaging;

a removal system configured to:
  issue a command from the application management server to the installed control bundle to cause the control bundle to extract the native application from the control bundle at the client device, where the created link between the control bundle and the native application is maintained; and
  deploy, via the installed control bundle in response to the command issued by the application management server, the extracted native application directly within a native environment of the client device, the native environment being an environment of a primary operating system of the client device and separate from the control environment; and
a control system for controlling the native application from the application management server within the native environment via the control bundle installed within the control environment using the maintained link.

14. The system of claim 13, wherein the control system for controlling native applications is embodied within an application management server.

15. The system of claim 13, wherein the control system for controlling the native application within the native environment issues a life cycle command to manage a life cycle of the native application to an agent within the control environment to carry out the life cycle command.

16. The system of claim 15, wherein the life cycle is managed by performing an action selected from a group consisting of starting the native application, stopping the native application, installing the native application and uninstalling the native application.

17. The system of claim 13, further comprising a deployment system for deploying the control bundle within the native environment.

18. The system of claim 17, wherein the deployment system is loaded on an application management server.

19. The system of claim 17, wherein the deployment system is loaded on the client device.

20. The system of claim 13, where the command issued from the removal system to the installed control bundle to cause the control bundle to extract the native application from the control bundle at the client device further causes the native application to be removed from the control bundle while maintaining the link.

21. The system of claim 20, wherein the removal system is loaded on an application management server.

22. The system of claim 20, wherein the removal system is loaded on the client device.

23. A system for controlling native applications using control bundles, comprising:
  means for packaging at an application management server, a native application within a control bundle to create a link between the control bundle and the native application;
  means for installing the via the application management server, control bundle within a control environment of a client device in response to the packaging:
  means for issuing a command from the application management server to the installed control bundle to cause the control bundle to extract the native application from the control bundle at the client device, where the created link between the control bundle and the native application is maintained:
  means for deploying, via the installed control bundle in response to the command issued by the application management server, the extracted native application directly within a native environment of the client device, the native environment being an environment of a primary operating system of the client device and separate from the control environment; and
  means for controlling a life cycle of the native application from the application management server within the native environment via the control bundle installed within the control environment using the maintained link.

24. The system of claim 23, wherein the system for controlling native applications is embodied within an application management server.

25. The system of claim 23, wherein the means for managing issues a life cycle command to manage a life cycle of the native application to an agent within the control environment to carry out the life cycle command.

26. The system of claim 23, wherein the life cycle is managed by performing an action selected from a group consisting of starting the native application, stopping the native application, installing the native application and uninstalling the native application.

27. A program product stored on a recordable medium for controlling native applications using control bundles, which when executed, comprises:
  program code for packaging at an application management server, a native application within a control bundle to create a link between the control bundle and the native application;
  program code for:
  installing via the application management server, the control bundle within a control environment of a client device in response to the packaging;
    issuing a command from the application management server to the installed control bundle to cause the control bundle to extract the native application from the control bundle at the client device, where the created link between the control bundle and the native application is maintained; and
  deploying via the installed control bundle in response to the command issued by the application management server, the extracted native application directly within a native environment of the client device, the native environment being an environment of a primary operating system of the client device and separate from the control environment; and
  program code for controlling the native application from the application management server within the native environment via the control bundle installed within the control environment using the maintained link.

28. The program product of claim 27, wherein the program product is embodied within an application management server.

29. The program product of claim 27, wherein the program code for controlling the native application within the native environment issues a life cycle command to manage a life cycle of the native application to an agent within the control environment to carry out the life cycle command.

30. The program product of claim 29, wherein the life cycle is managed by performing an action selected from a group consisting of starting the native application, stopping the native application, installing the native application and uninstalling the native application.

31. The program product of claim 27, further comprising program code for deploying the control bundle within the native environment.

32. The program product of claim 31, wherein the program code for deploying is loaded on an application management server.

33. The program product of claim 31, wherein the program code for deploying is loaded on the client device.

34. The program product of claim 27, wherein the program code for issuing the command to the installed control bundle to cause the control bundle to extract the native application further comprises program code for removing the native application from within the control bundle while maintaining the link.

35. The program product of claim 34, wherein the program code for removing is loaded on an application management server.

36. The program product of claim 34, wherein the program code for removing is loaded on the client device.

* * * * *